TRANSDUCER DRIVING ARRANGEMENT FOR RECORDING AND REPRODUCING APPARATUS

Filed Jan. 13, 1967

4 Sheets-Sheet 1

INVENTOR
WILLIAM L. DOLLENMAYER

BY D. Kendall Cooper
ATTORNEY

Oct. 7, 1969 W. L. DOLLENMAYER 3,471,654

TRANSDUCER DRIVING ARRANGEMENT FOR RECORDING AND REPRODUCING APPARATUS

Filed Jan. 13, 1967 4 Sheets-Sheet 2

United States Patent Office 3,471,654

Patented Oct. 7, 1969

3,471,654

TRANSDUCER DRIVING ARRANGEMENT FOR RECORDING AND REPRODUCING APPARATUS

William L. Dollenmayer, Lexington, Ky., assignor to International Business Machines Corporation, Armonk, N.Y., a corporation of New York Filed Jan. 13, 1967, Ser. No. 609,232
Int. Cl. G11b *5/00*
U.S. Cl. 179—100.2 18 Claims

ABSTRACT OF THE DISCLOSURE

The embodiment disclosed comprises dictating apparatus having a main housing for electrical and mechanical components, an associated microphone and speaker, and provision for retaining a magnetic record card in position for recording and reproducing sound. The apparatus includes several escapement and lead screw driving means for stepping a transducer member to record or to pick up signals on the record card on a line-by-line basis with the transducer scanning one line in a first directon, stepping, scanning the next line in the opposite direction, stepping, etc. The apparatus further includes a driving motor that is retained alternately in one or the other of two bistable conditions and that cooperates with a pair of drive discs to effect rotation of the transducer scanning lead screw alternately in one direction and in the opposite direction.

BACKGROUND OF THE INVENTION

Field of the invention

The field of art to which the invention pertains comprises devices for recording and reproducing signals from a magnetic record media by means of a scanning transducer member. The source of signals to be recorded and the utilization means for the signals is not of primary concern, and the signals may be in the form of audio of digital impulses. The field of art further contemplates driving arrangements for accomplishing reciprocating and intermittent stepping action of a driven member

Description of the prior art

Numerous arrangements have been made for controlling the scanning of a transducer in relation to a record media on a line-for-line basis. Arrangements have contemplated the driving of a transducer by a plurality of lead screws alternately connected to the prime motive means when a change in direction of scanning is required; or driving the transducer by means of a double threaded lead screw such as the "fishing reel" type; or reversing the drive motor electrically; as well as many other diverse mechanical and electrical arrangements.

The present inventive arrangements insure positive drive during scanning, rapid reversal of scanning and simplify servicing considerably.

SUMMARY

As contemplated by the present invention, the driving means for effecting transducer scanning are of simplified design and scanning reversal is effected quickly and simply by conditioning the driving motor alternately to one or the other of two bistable conditions.

Broadly, the present invention concerns itself with arrangements for effecting line-by-line scanning of a record media by a transducer together with intermittent stepping of the transducer at the end of each line scan.

Accordingly, it is an object of the present invention to provide transducer scanning arrangements of simplified design while insuring positive, accurate, and rapid operation of the assembly.

A further object of the present invention is to provide improved transducer scanning arrangements for recording and reproducing information from a record media.

Still another object of the present invention is to establish automatic and accurate control of transducer scanning of a record media while maintaining a desirable measure of manual control, as well.

Also, an object of the invention is to provide arrangements of the nature indicated that accommodate magnetic media, facsimile media, photographic media, and/or audio as well as digital recorded information.

A still further object of the invention is to establish a high quality of sound recording and reproduction with a reversible scanning transducer wherein pauses encountered due to the reversing action are not discernible to the average listener.

A further object of the invention is to provide phasing facilities in apparatus of this nature that enables scanning in a particular direction of a track that was previously recorded in the opposite direction, as under circumstances where copies are made from master media.

The foregoing and other objects, features, and advantages of the invention will be apparent from the following more particular description of the preferred embodiment of the invention as illustrated in the accompanying drawings.

Figure 1:
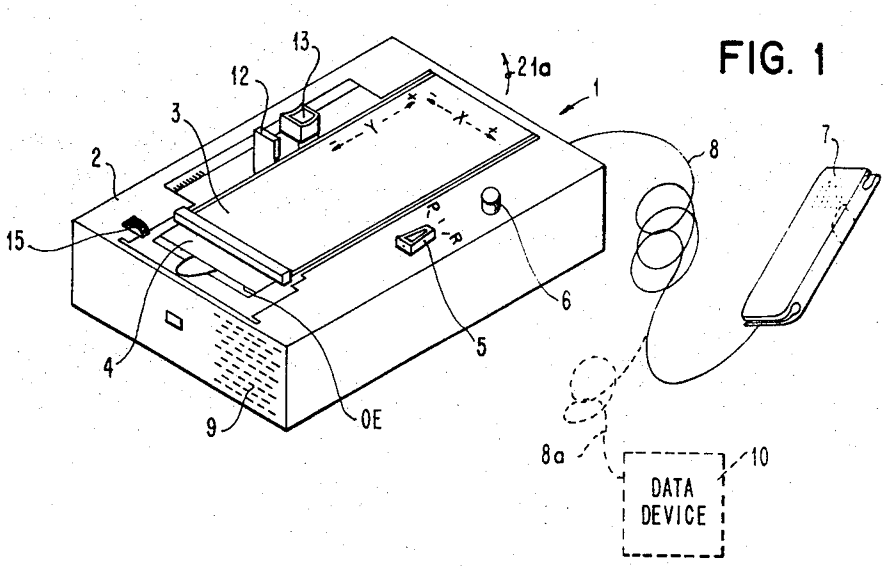
FIG. 1 illustrates a dictating unit with associated microphone and speaker for recording and reproducing audio signals on a magnetic record card.

FIGS. *4a–4f* depict representative conditions of the transducer driving and stepping mechanisms during scanning of the record card in the apparatus of FIG. 1.

Figure 2:
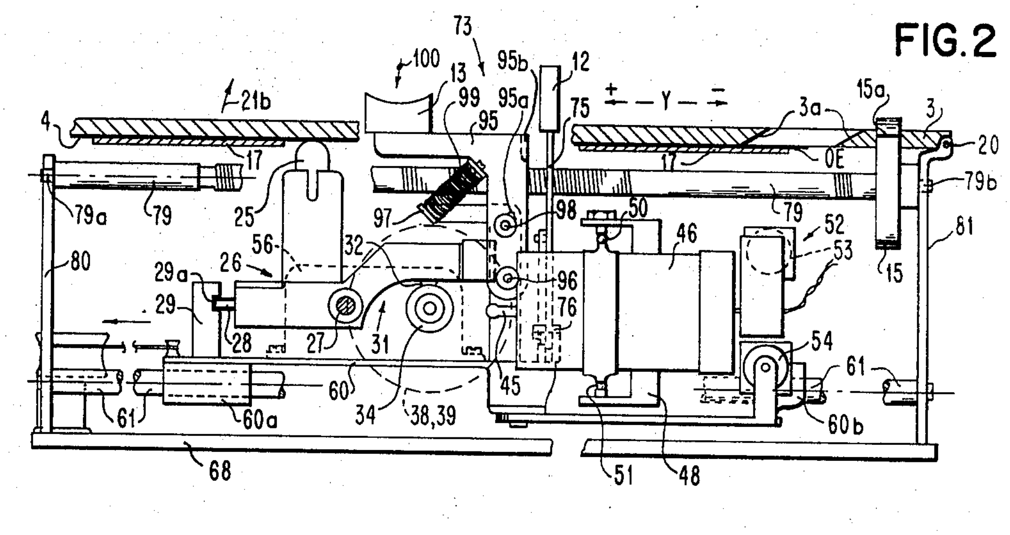
FIG. 2 illustrates various internal mechanisms concerned with transducer scanning in the apparatus of FIG. 1.
Figures 5, 5A, 6A, 6B, 6C, 6D:
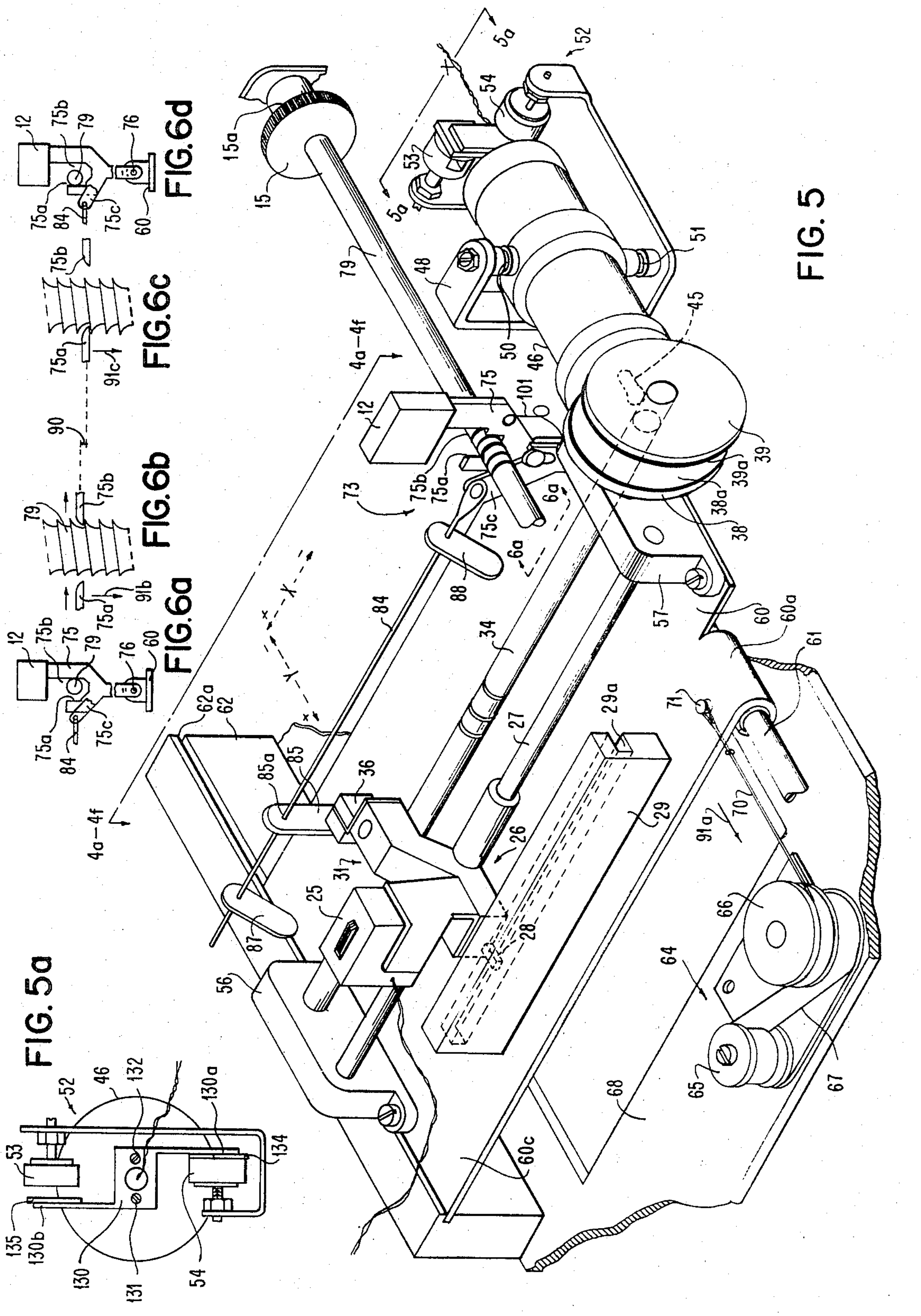

FIG. 5 is a perspective view of the mechanisms of FIGS. 2 and *4a–4f*.

FIG. *5a* is an elevational view of various bistable means associated with thed riving motor in FIGS. 2 and 5.

Figure 3:
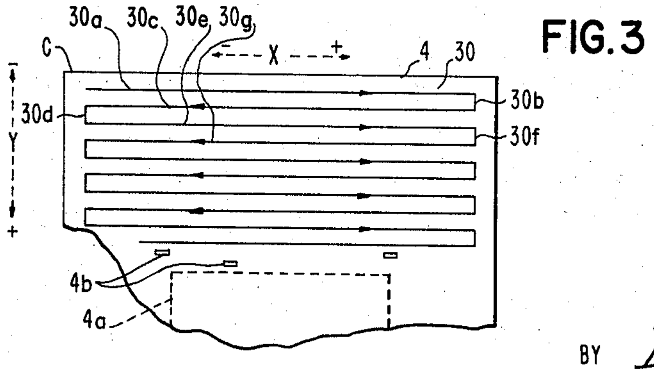
FIG. 3 illustrates the transducer scanning path on the underneath surface of a magnetic record card in the apparatus of FIG 1.

FIGS. *6a–6d* illustrate the line stepping action that occurs at the end of each line scan in FIG. 3

Figure 7:
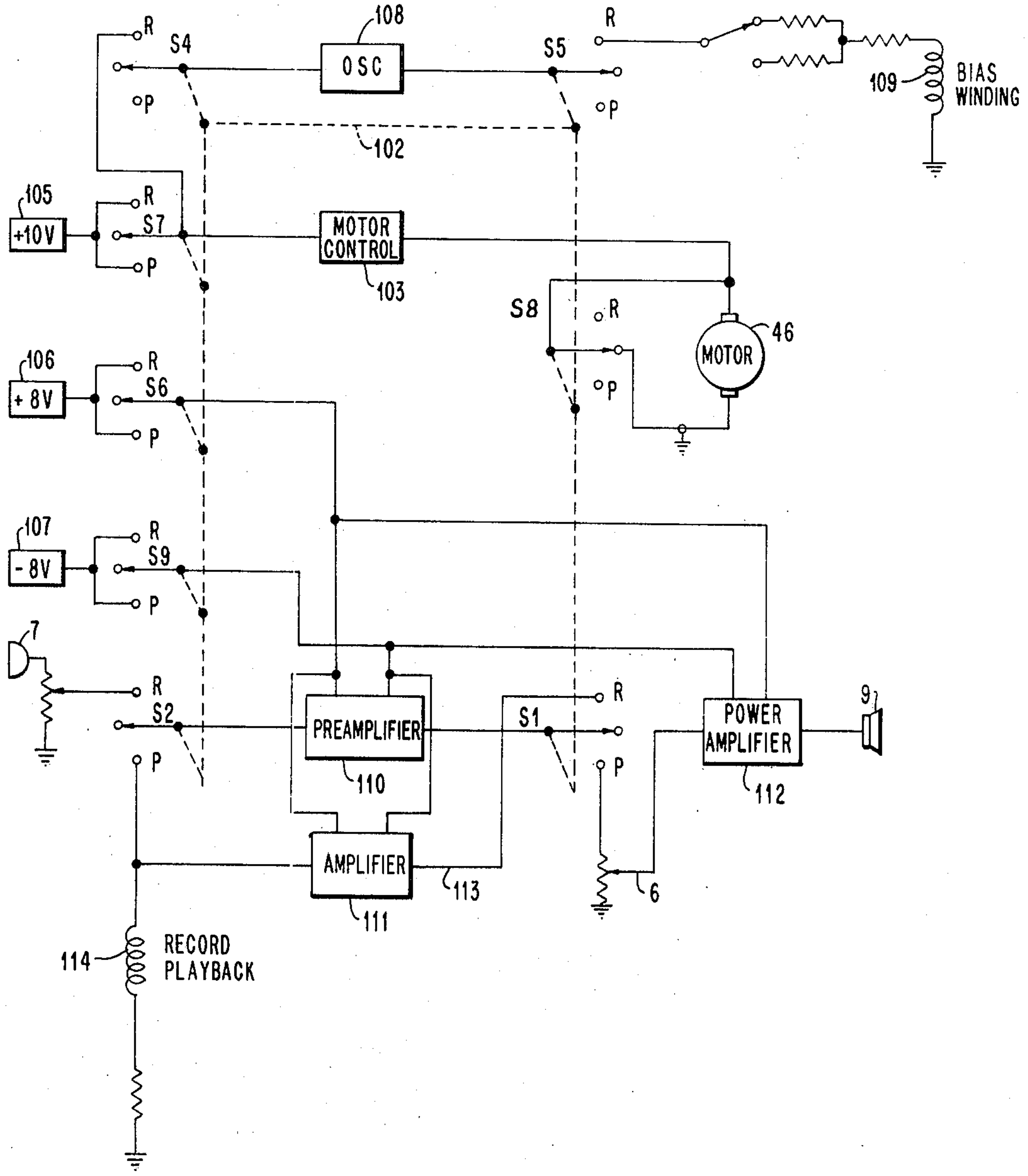

FIG. 7 shows a number of circuits that are incorporated in the apparatus of FIG. 1 for controlling the modes of operation, the driving and scanning.

DESCRIPTION OF THE PREFERRED EMBODIMENT

In FIG. 1, a dictation unit 1 for recording and reproducing sound comprises a housing 2 that accommodates the various electrical and mechanical components of the apparatus and that has a card retainer 3 for receiving a magnetic record card 4. For convenience in the present description, the outer end of the record card 4 is designated "OE". Also, as shown in FIGS. 1 and 3, the record card is scanned line-by-line by a transducer in alternate opposite directions designated X+ and X— with stepping of the transducer occurring in another direction designated Y+ for normal dictation and reproduction of signals, and backstepping occurring, when required, in a Y— direction. The foregoing designations are used throughout the present application to insure orientation of the reader as the various views in the drawings are discussed.

Dictation unit 1 has a mode control knob 5 with associated switches shown in greater detail in FIG. 7 and designated S1–S9. Mode control knob 5 has three positions left, center, and right, designated P, no designation, and R, standing for "Playback," "Off," and "Record" modes, respectively.

To record signals, the operator places mode control knob in the Record position and dictates material into microphone 7 that is connected by cable 8 to unit 1. As an alternative, a data device 10 for supplying and utilizing signals can be connected by cable 8*a* to unit 1 rather than microphone 7. A scanning button 12 and backspacing button 13 are used by the operator to manually scan and backstep the transducer with respect to the record card 4. A phasing knob 15 is available for fine tuning the transducer in relation to a recorded track as well as to enable scanning of the transducer in a particular preferred direction with respect to any track on the record card 4.

As shown more clearly in FIG. 2, a record card 4 is is inserted into position for scanning in the apparatus through a slot 3*a* in the card retainer 3. Card 4 is retained by retaining rails, such as rail 17 on the underneath side of retainer 3. For convenience in gaining access to components in housing 2, retainer 3 is pivotally mounted at 20 to be swung upwardly out of scanning position as indicated by arrows 21*a* and 21*b*, FIGS. 1 and 2, respectively.

When card 4 is inserted through slot 3*a*, it is thereupon retained in a stationary position throughout record- and and reproducing operations. Signals are recorded upon the underneath magnetic surface of card 4 and reproduced therefrom by a transducer 25 that is stepped and scanned in a generally rectinlinear fashion adjacent the stationary card 4 as shown in greater detail in FIG. 3. In addition to storing magnetic information, whether audio or digital, card 4 may also be provided with a photographic area 4*a* for projection of a related visual scene while scanning of the information on the card takes place. Also, card 4 may be perforated with information as at 4*b* for sensing of other information.

A typical path traced by transducer 25 on the underneath surface of card 4 is designated 30 in FIG. 3 and has a number of portions designated 30*a*–30*g* etc., that are established by the scanning and stepping mechanisms in the apparatus. The mechanisms involved are shown particularly in FIGS. 2, *4a–4f*, 5, *5a*, and *6a–6d*. The electrical circuits involved for recording and reproducing operations are shown in detail in FIG. 7, with control exerted by switch sections S1–S9.

SCANNING IN THE X DIRECTION

It is assumed that card 4 is in position in the apparatus for scanning by transducer 25. Normally, scanning is initiated at the outer end of card 4 designated OE and transducer 25 is normally at the extreme right end of its travel in FIG. 2 in order to trace portion 30*a* of path 30, FIG. 3.

Transducer 25 is part of a transducer assembly 26 that is mounted on a guide rod 27 for movement in the X direction as required for tracing path portons 30*a*, 30*c*, and 30*e*, etc., FIG. 3. Transducer assembly 26 has an extension 28 that rides in a reaction track 29*a* in a block 29. Formed as part of the transducer assembly 26 is a follower assembly 31 having a follower 32 that engages a rotatable lead screw 34. Affixed to the right end of lead screw 34, FIG. 5, are two drive discs 38 and 39 having frictional surfaces 38*a*–39*a*, respectively, such as rubber or comparable material. Extending between the drive discs 38 and 39 is a pulley shaft 45 of a bistable motor 46. As can be seen most clearly in FIGS. *4a–4f*, bistable motor 46 is adapted for movement into one or the other of two alternate positions in order that the rotaing pulley shaft 45 is engaged with discs 38 and 39 alternately as scanning proceeds. This rotates lead screw 34 alternately in first one direction and then in the opposite direction to effect movement of transducer 25 along the portions 30*a*, 30*c*, 30*e*, etc. of path 30, FIG. 3.

Motor 46 is mounted for bistable pivoting action around a vertical axis established by a mounting bracket 48 and two pivot ball bearings 50 and 51, FIGS. 2 and 5. Associated with motor 46 is a permanent magnet assembly 52 having permanent magnets 53 and 54, each mounted in the assembly to cooperate with magnetic elements associated with motor 46 for retaining it in the two bistable conditions, as required.

Guide rod 27 and lead screw 34 are retained in bushing assemblies 56 and 57 that are more clearly seen in FIG. 5.

All of the foregoing elements including motor 46 are mounted on a carrier assembly 60 having portions 60*a* and 60*b* mounted on a guide rod 61 and a portion 60*c* engaged in a reaction track 62*a* of a block 62 for movement forwardly in the Y+ direction or reversely in the Y— direction.

STEPPING AND SCANNING OF TRANSDUCER IN Y DIRECTION

Carrier 60, together with transducer 25, and the other elements previously discussed, are movable in an incremental fashion in a forward Y+ direction or reverse Y— direction as well as forwardly and reversely under manual and continuous control exerted by depression of scanning button 12.

During normal recording and reproduction of sound, transducer 25 is stepped from one line scan portion, such as 30*a*, FIG. 3, to succeeding line scan portions 30*c* and 30*e* by incremental steps in the forward direction indicated at 30*b*, 30*d* and 30*f*. A spring motor assembly 64 comprising first and second capstan members 65 and 66 and a cooperating tensioned spring element 67 is mounted to the machine frame 68 and maintains a predetermined pull on carrier 60 in the Y+ direction under control of a spacing mechanism 73 that includes the scanning button 12. Backspacing is under control of backspace button 13. The scanning mechanisms associated with button 12 are shown in FIGS. 2 and 5 but the backspacing mechanism associated with button 13 is shown only in FIG. 2 to clarify the arrangement of elements in FIG. 5.

Scanning button 12 is mounted on a stem 75 that is pivotally mounted to carrier 60 by stud 76 as more clearly seen in FIGS. *6a* and *6d*. Stem portion 75 has two teeth 75*a* and 75*b* formed therein and arranged on opposite sides of a lead screw 79. Lead screw 79 is provided with a predetermined threaded configuration shown more clearly in FIGS. *6b* and *6c* that determines the extent of incremental movement of carrier 60 in the Y direction, whether forwardly or reversely. Lead screw 79 is maintained in a snug lateral position but mounted for rotation by engagement with upright members 80 and 81 that extend from the base frame 68. Lead screw 79 has bearing portions 79*a* and 79*b* rotatably mounted in complementary apertures in the members 80 and 81, respectively.

Pivotally attached to an extension 75c of stem 75 is an escapement link 84 mounted for sliding movement in an aperture 85a of an upright support 85 that extends vertically from carrier 60. As viewed in FIG. 5, escapement link 84 is movable to the left and right a limited extent in the X+ and X− directions. Mounted on escapement arm 84 is a pair of escapement arms 87 and 88 that extend downwardly at an angle into the path of movement of follower 31 as it is moved back and forth in the X+ and X− directions on lead screw 34. When bumper 36 on follower 31 encounters escapement trip arm 87, stem 75 is moved leftwardly so that tooth 75b will engage lead screw 79 as shown in FIG. 6a. With stem 75 to the left, FIG. 6a, and tooth portion 75b engaged with lead screw 79, the relationship of the elements is as shown in FIG. 6b.

With a reversal of rotation of lead screw 34, follower 31 moves in the X− direction toward escapement trip arm 88. When bumper 36 on follower 31 encounters trip arm 88, the interconnection of link 84 with stem 75 moves stem 75 to the right so that tooth portion 75a now engages lead screw 79 as shown in FIGS. 6c and 6d. However, while stem 75 is moving to the right, FIG. 6d, tooth portion 75a takes up engagement with lead screw 79 one-half of the pitch spacing between two successive teeth on lead screw 79 as represented by the marked interval 90 between FIGS. 6b and 6c, due to the pull exerted by cord 70 in the Y+ direction represented by arrows 91a, 91b, and 91c. Increment 90 corresponds to the increments 30b, 30d, 30f, etc. in the path of movement of transducer 25 in the Y direction.

Concurrently with the escapement action just described, motor 46 is moved alternately from one driving connection with discs 38 and 39 to the opposite driving direction to effect rotation of lead screw 34 in the opposite direction. This action will be described in detail in connection with FIGS. 4a–4f.

A mechanism for performing half space and full space operations that is somewhat similar to that just described is disclosed in the article entitled "Half Space and Full Space Mechanism," authored by W. L. Dollenmayer and appearing at pages 626 and 627 in the September 1965, edition of the IBM Technical Disclosure Bulletin, vol. 8, No. 4. The article describes half spacing and full spacing actions with a teeter-totter arm having pawl extensions at its extremities in contrast with the stem design disclosed herein.

At times, during the course of dictation and reproduction of signals, an operator desires to review material previously encountered on the record card 4. For example, the operator may be scanning line 30e, FIG. 3 and may wish to again scan line 30c, FIG. 3. In order to perform incremental backspacing, the mechanism associated with button 13 is provided. As may be seen more clearly in FIG. 2, button 13 is mounted to a bell crank member 95 that is pivotally connected to carrier 60 by a stud 96 affixed to an upright angular member 97 extending from carrier 60. Member 95 has a slotted portion 95a that cooperates with a stud 98 extending through the slot 95a from the angular member 97. A spring 99 maintains button 13 and member 95 normally in the position shown in FIG. 2. Extending downwardly from member 95 on the reverse side for engagement with lead screw 79 when required during backspacing is a pawl portion 95b.

With the foregoing backspacing arrangement, backspacing is effected in the following manner. When button 13 is depressed, pawl 95b, which is closely positioned adjacent the threaded lead screw 79 comes into engagement with one of the teeth on lead screw 79. The point of engagement of pawl 95b with lead screw 79 now becomes a pivot point for the angular member 95 which continues to rotate in a counterclockwise direction indicated by arrow 100. Due to the connection of member 95 by stud 96 to the upright angular member 97 extending from carrier 60, carrier 60 is moved to the right in FIG. 2 which is in the Y− direction, or reverse direction, along lead screw 79. Key stem 75 remains in a spring loaded condition against lead screw 79 but is ratcheted along the teeth to take up a new backspaced position. The extent of backspacing is limited by the interaction of stud 98 with the slotted portion 95a. Stud 98 moves to the right in slotted portion 95a due to the force exerted at pivot point 96 in the Y− direction. The extent of movement in the backspacing direction may be equivalent to several threaded increments on lead screw 79. As soon as stud 98 in member 97 encounters the rightmost extremity of slotted portion 95a, the downward movement of member 95 is prevented and a subsequent release by the operator leaves the carrier 60 in a new position backspaced from its previous position and with the stem 75 engaged with another thread on lead screw 79.

MANUAL SCANNING

Completely random scanning of magnetic card 4 is performed by depressing button 12 which is normally spring loaded upwardly by spring 101, FIG. 5. Depressing button 12 and stem 75 downwardly disengages teeth 75a and 75b from lead screw 79, and the entire carrier assembly 60 is then free to be moved in a Y+ or Y− direction, as desired by the operator.

PHASING

Affixed to lead screw 79 is a phasing knob 15 with an indicator mark 15a. Under some circumstances, such as when duplicate magnetic copies are prepared from master magnetic copies, the track portions on the duplicate are 180 degrees out of phase with the corresponding track portions on the master. Accordingly, in order to derive intelligible information from the track portions, it may be necessary to have the transducer 25 scan in the opposite direction along the X axis of card 4 at a particular line increment location along the Y direction, rather than in the normal line scanning direction. To illustrate, line portion 30a, FIG. 3, would require scanning to the left rather than to the right, as shown, and line portion 30c would require scanning to the right rather than to the left, as shown. When knob 15 is rotated, lead screw 79 is also rotated and engagement of one of the teeth 75a or 75b effects movement of carrier 60. As a consequence, transducer 25 is moved in a Y+ direction or a Y− direction depending upon the direction of rotation of lead screw 79. In this manner, transducer 25 is displaced an extent that is dependent upon the extent of rotation of knob 15.

The foregoing phasing is also useful for simply tuning in, that is adjusting transducer 25 accurately with respect to any selected line portion 30a, 30c, etc., under normal operating conditions when no line reversal is involved, as just described.

COMBINED X SCANNING AND Y STEPPING

Stepping and scanning of transducer 25 in relation to record card 4 will be described by reference to path 30, FIG. 3, during a typical recording and reproducing operation.

To activate dictation unit 1 for recording, knob 5 is moved to the record R position in FIG. 1 which by the interconnected dashed line 102, FIG. 7, transposes all of the switch contact sections S1–S9 to the respective upper record R positions. Switch section S3, not shown, is a spare section that is not used. It is assumed of course, that a record card 4 is in proper position under retainer 3. Transfer of the switch contacts S1–S9 as indicated, supplies potentials of +10 volts, +8 volts, and −8 volts from sources 105, 106, and 107, respectively to the various machine circuits. Oscillator 108 is activated through switch sections S7, S4, and S5 to provide appropriate A-C bias to the bias winding 109 on transducer 25. The +10 volt potential is also supplied through switch section S7 to motor 46 thereupon initiating rotation of lead screw 34 and driving of transducer 25 in relation to card 4. The potentials from sources 106 and 107 are supplied through switch sections S6 and S9 to a preamplifier stage 110, an amplifier stage 111, and a power amplifier stage 112.

With switch sections S1 and S2 in their upper positions signals directed to microphone 7 pass through preamplifier stage 110 and by line 113 and amplifier 111 to the record playback winding 114 on transducer 25. Starting and stopping of the machine during recording is accomplished by movement of knob 5 between the record and off positions as required by operator.

In a playback operation, all of the switch sections S1–S9 are connected to their lower playback P positions by movement of knob 5 to the playback P position.

During playback, oscillator 108 is ineffective. Motor 46 continues to derive power from source 105 through motor control 103. The potentials from sources 106 and 107 are also applied to the amplifier stages 110–112. During playback, signals generated in winding 114 as transducer 25 scans record card 4 are applied through switch section S2 to preamplifier stage 110. The output of preamplifier stage 110 is directed through switch section S1 volume control 6, power amplifier stage 112, and applied as audio signals to the speaker 9.

The scanning and stepping action that takes place during recording or reproduction of signals is illustrated in FIGS. 4*a*–4*f*. The figures represent different conditions of motor 46 and transducer 25 and are top elevations of the scanning and stepping mechanism shown in FIGS. 2 and 5. It is assumed that the scanning by transducer 25 is picked up in FIG. 4*a* during the line scanning of line **30*c* in the X− direction. The reader will recall that path 30 traced on card 4, FIG. 3, represents the underneath side of the card and that the movement of transducer 25** in FIG. 4*a* corresponds to the scanning movement on path portion **30*c*. Under the driving conditions indicated, stem 75 is engaged with lead screw 79** as shown in FIG. 6*a*.

Figures 4A, 4B, 4C, 4D, 4E, 4F:
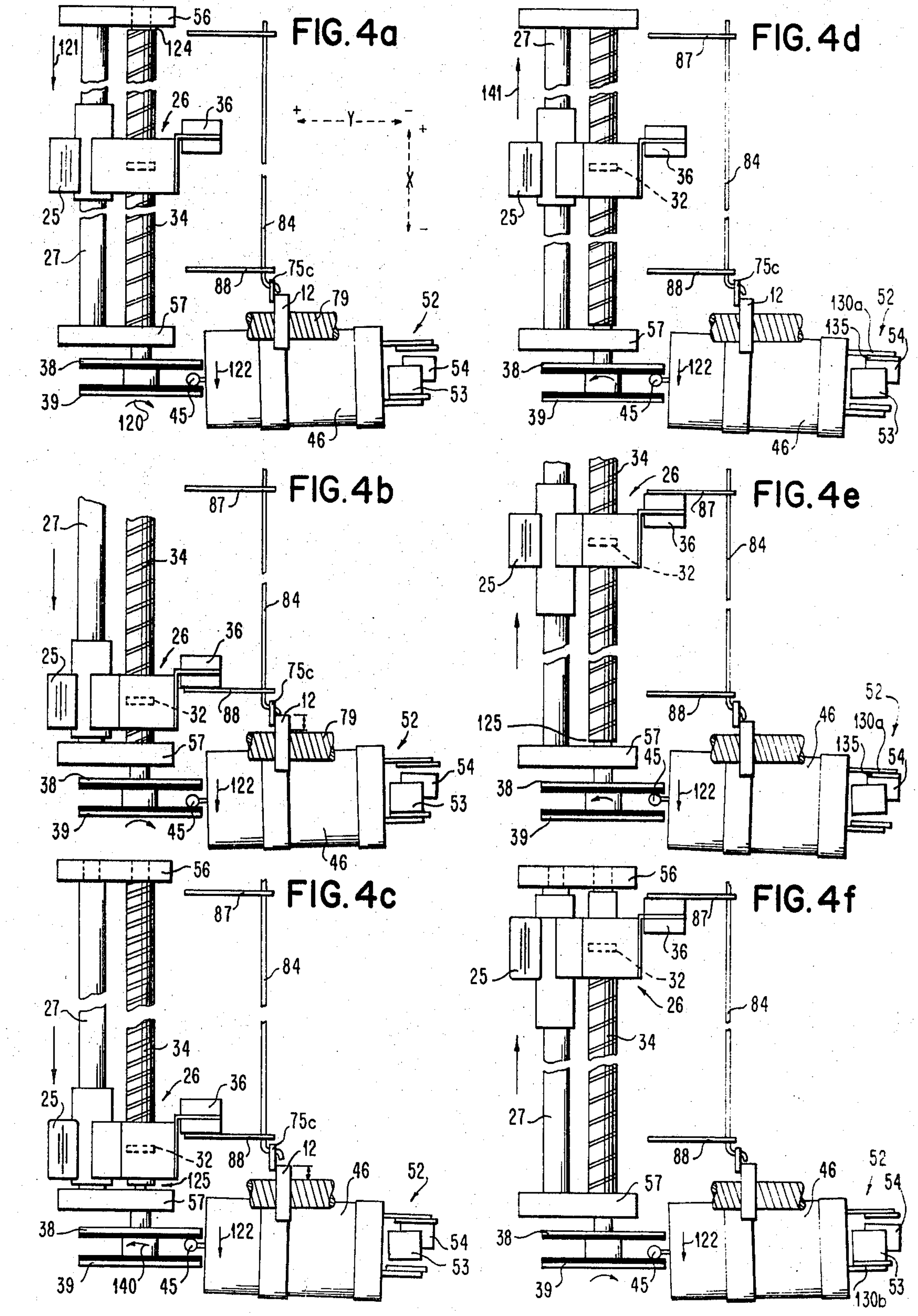

In FIG. 4*a*, motor 46 drives disc 39 to rotate lead screw 34 as indicated by arrow 120 and to drive transducer 25 in a direction indicated by arrow 121. The rotation of pulley 45 on motor 46 as viewed from the top is indicated by arrow 122. The direction of rotation of pulley 45 remains constant throughout operation of the apparatus.

Continued driving of transducer 25 by engagement with lead screw 34 moves transducer assembly 26 to the point where bumper 36 engages escapement trip arm 88. With trip arm 88 affixed to escapement link 84, stem 75 is moved toward the position shown in FIG. 6*d* which, as previously described, steps the entire carrier assembly 60, including transducer 25, in the +Y direction by one increment as evidenced by the path portion **30*d***, FIG. 3.

Lead screw 34 has a slight lateral play in the supports 56 and 57. Engagement of bumper 36 with escapement trip arm 88 subsequent to the movement of stem 75 to the position shown in FIG. 6*d* sets up a reactive force which effectively stops the movement of transducer 25. However, pulley 45 extending from motor 46 continues to rotate shaft 34 and due to the threaded engagement of lead screw 34 with follower 32, lead screw 34 is moved upwardly, FIG. 4*b*, carrying with it discs 38 and 39. The direction of reaction of lead screw 34 is upwardly in FIG. 4*b* to the extent permitted by the clearance that previously existed at 124 between the upper end portion of lead screw 34 and the mounting block 56. Due to the engagement of pulley 45 with disc 39, forces exerted on pulley 45 in an upward direction tend to pivot motor 46 in the bracket 48, FIG. 5. The pivoting action exerted on motor 46 is sufficient to move moitor 46 into the other of its bistable conditions whereupon pulley 45 becomes engaged with disc 38 to drive lead screw 34 in the opposite rotative direction, FIG. 4*c*. The clearance 124 that previously existed between lead screw 34 and block 56 is now transferred as indicated at 125 between lead screw 34 and mounting block 57.

LATCHING MEANS FOR RETAINING MOTOR IN ITS BISTABLE CONDITION

Attention is now directed to FIGS. 5 and 5*a*, which show the structural details of the latching means for retaining motor 46 in one or the other of its bistable driving positions. Mounted to the non-driving extremity of motor 46 is a nonmagnetic bracket assembly 130, as by screws 131 and 132. Bracket 130 has a magnetic spacer 134 arranged for cooperative engagement with permanent magnet 54 and a magnetic spacer 135 arranged for cooperation with permanent magnet 53. As illustrated in FIG. 5*a*, portion 134 is touching magnet 54 and an air gap exists between spacer 135 and magnet 53. This corresponds to the condition of motor 46 in FIG. 4*c*.

With pulley 45 engaging disc 38, lead screw 34 is now rotated in the direction indicated by arrow 140, FIG. 4*c*. Transducer 25 is now moved upwardly in FIG. 4*d* in the direction indicated by arrow 141 and the scanning of line portion **30*e*** ensues.

FIG. 4*e* represents the exact instant when bumper 36 contacts escapement trip arm 87 on escapement link 84. Engagement of bumper 36 with trip arm 87 moves link 84 upwardly and through the pivotal connection to arm **75*c* transfers engagement of stem 75 with lead screw 79 to the tooth portion 75*b*** as shown in FIG. 6*a*, rather than the tooth portion **75*a*** as shown in FIG. 6*d*. Link 84 has a limited amount of movement determined by the contact between tooth **75*b* and lead screw 79 whereupon arm 87 reacts against bumper 36** as in FIG. 4*e* and brings transducer assembly 26 to a standstill. This corresponds to the line scanning portion **30*f***, FIG. 3.

Since transducer assembly 26 is now immobile, and since lead screw 34 continues to be driven by engagement of pulley 45 with disc 38, lead screw 34 reacts by moving in a downward direction to the extent permitted by the clearance 125 between lead screw 34 and block 57. As a consequence of the downward movement of lead screw 34, disc 38 forces pulley 45 downwardly and flips motor 46 to its opposite bistable position, overcoming its magnetic attraction of magnet 54 with portion **130*a* of bracket 130. Motor 46** now assumes the original condition as in FIG. 4*f* with pulley 45 engaging disc 39 and lead screw 34 rotating in a direction opposite to the direction in FIG. 4*e*. Transducer 25 now scans the portion **30*g* of path 30, FIG. 3. Portion 130*b* of bracket 130 is now attracted to magnet 53 and motor 46** is retained in the condition shown in FIGS. 4*f* and 4*a* until the next stepping and direction-changing operation takes place at the end of line portion **30*g***.

The foregoing scanning and stepping arrangements establish accurate line scan portions **30*a*, 30*c*, and 30*e*, as well as accurate incremental portions 30*b*, 30*d*, and 30*f***, FIG. 3.

SUMMARY

From the foregoing description it is apparent that a new stepping and scanning arrangement has been provided for use in recording and reproducing apparatus which is of simplified construction and that insures accurate and reliable scanning of a record media.

While the invention has been particularly shown and described with reference to a preferred embodiment, it will be understood by those skilled in the art that various changes in form and detail may be made without departing from the spirit and scope of the invention.

What is claimed is:

1. Apparatus for scanning a media in a plurality of alternate directions, comprising:

transducer means;

means for retaining said media adjacent said transducer means for scanning;

a unitary rotatable means having at least first and second integral surfaces arranged for driving engagement and normally engaged with said transducer means and operable in one rotation mode when said first surface is engaged to drive said transducer means in a first direction and in another rotation mode when said second surface is engaged to drive said transducer means in a second direction;

and motive means normally extending in proximity to said surfaces, said motive means being settable into engagement with a first surface of said rotatable means in a first state to establish said first rotation mode and further settable into engagement with said second surface of said rotatable means in a second state to establish said another rotation mode.

2. The apparatus of claim 1, wherein:

said first and second directions are opposite one another.

3. The apparatus of claim 1, wherein:

said rotatable means is a lead screw, and wherein said motive means is a motor mounted for engagement with said first or second surfaces of said rotatable means in either of two bistable conditions, respectively.

4. The apparatus of claim 3, wherein:

said media is a magnetic record card for storing signals induced therein, and wherein said transducer means is a magnetic transducer head assembly for recording and reproducing signals in said media.

5. The apparatus of claim 3, wherein:

said lead screw is provided with two discs, and wherein said motor has a driving pulley that engages one or the other of said discs depending upon the bistable condition of said motor.

6. The apparatus of claim 5, wherein:

said lead screw is mounted in a pair of bushing assemblies with a limited axial clearance, and wherein means is provided for stopping the movement of said transducer means as it nears the end of travel in each of said directions, and wherein reaction between said lead screw and said transducer means as said transducer means is stopped is effective to move said lead screw axially, to the other of its conditions by engagement of said pulley with one of said discs.

7. The apparatus of claim 1, further comprising:

stepping means operable as said transducer reaches the end of travel in one of said directions to step said transducer means a predetermined amount in relation to said media.

8. The apparatus of claim 7, wherein:

said stepping means is rendered effective by engagement of said transducer means as it nears the end of travel in any of said directions.

9. The apparatus of claim 7, wherein:

said transducer means is effective to set said motive means to an opposite state as it nears the end of travel in any direction.

10. The apparatus of claim 7, wherein:

said transducer means is also effective to actuate said stepping means concurrently with the setting of said motive means.

11. Apparatus for scanning a media in a plurality of alternate directions, comprising:

transducer means;

means for retaining said media adjacent said transducer means for scanning;

rotatable means normally engaged with said trasnducer means and operable in one rotation mode to drive said transducer means in a first direction and in another rotation mode to drive said transducer means in a second direction;

motive means normally engaged with said rotatable means and settable to a first state to establish said first rotation mode and to a second state to establish said another rotation mode;

stepping means rendered operable by engagement of said transducer means as said transducer means reaches the end of travel in any of said directions to step said transducer means a predetermined amount in relation to said media, said stepping means comprising a lead screw and a double pawl element alternately engageable with said lead screw and interconnected with said transducer means to maintain said transducer means in a rectilinear relationship with said media during each scanning movement of said transducer means;

and resilient means in said apparatus for exerting force on said transducer means tending to move it in a partciular direction of stepping.

12. Apparatus for scanning a media in a plurality of alternate directions, comprising:

transducer means;

means for retaining said media adjacent said transducer means for scanning;

rotatable means normally engaged with said transducer means and operable in one rotation mode to drive said transducer means in a first direction and in another rotation mode to drive said transducer means in a second direction;

motive means normally engaged with said rotatable means and settable to a first state to establish said first rotation mode and to a second state to establish said another rotation mode;

stepping means operable as said transducer reaches the end of travel in one of said directions to step said transducer means a predetermined amount in relation to said media;

and means for backstepping said transducer means in a direction opposite to said stepping direction.

13. The apparatus of claim 12, further comprising:

manually operable means for overriding said stepping and said backstepping means to effect movement of said transducer means any desired amount in a stepping or backstepping direction.

14. Apparatus for scanning a media in a plurality of alternate directions, comprising:

a transducer means;

means for retaining said media adjacent said transducer means for scanning;

rotatable lead screw means normally engaged with said transducer means and operable in one rotation mode to drive said transducer means in a first direction and in another rotation mode to drive said transducer means in a second direction;

motive means comprising a motor mounted for engagement with said rotatable means in either of two bistable conditions, said motor being normally engaged with said rotatable means and settable to a first state to establish said first rotation mode and to a second state to establish said another rotation mode;

and a permanent magnet assembly located in proximity to said motor and arranged to retain said motor in one or the other of the conditions to which it is set.

15. The apparatus of claim 1, further comprising:

a microphone;

a speaker;

means responsive to audio signals received by said microphone to convert the same to electrical signals, and apply said electrical signals to said transducer for recording in said media as scanning proceeds;

means operable in another mode to receive signals from said transducer generated as it scans said media, to convert said signals and to apply the same to said speaker for reproduction; and dictation mode control means for establishing said recording and reproducing modes.

16. The apparatus of claim 1, further comprising:

a data device for supplying data signals to said transducer for recording on said media and for utilizing signals sensed by said transducer in said media as scanning proceeds, and mode control means for establishing said recording and sensing operations, as required.

17. The apparatus of claim 1, further comprising:
circuits for recording and reproducing signals through said transducer means;
means for establishing a recording or reproducing mode of operation in said apparatus as required; and wherein
all of said foregoing means are housed in a portable unit with provision for inserting and removing individual record media for recording and reproducing.

18. The apparatus of claim 1 further comprising stepping means operable as said transducer reaches the end of travel in one of said directions to step said transducer means a predetermined amount in relation to said media; and phasing means associated with said stepping means for modifying the scanning path taken by said transducer in relation to said media.

References Cited

UNITED STATES PATENTS

| | | | |
|---|---|---|---|
| 2,657,062 | 10/1953 | Meunier | 274—11 |
| 2,849,542 | 8/1958 | MacChesney | 179—100.2 |
| 2,926,920 | 3/1960 | Lorenz | 274—4 |
| 2,973,965 | 3/1961 | Whitney | 274—4 |
| 2,973,967 | 3/1961 | Freeman | 274—4 |
| 2,984,710 | 5/1961 | Trost | 274—4 |
| 3,026,381 | 3/1962 | Hoshino et al. | 179—100.2 |
| 3,091,668 | 5/1963 | Trost | 179—100.2 |
| 3,124,360 | 3/1964 | Starr | 274—11 |
| 3,176,083 | 3/1965 | Hauser | 179—100.2 |
| 3,222,074 | 12/1965 | Walker | 274—4 |
| 3,251,263 | 5/1966 | Gerry | 274—4 |
| 3,341,668 | 9/1967 | Walker | 179—100.2 |

STANLEY M. URYNOWICZ, Jr., Primary Examiner

J. P. MULLINS, Assistant Examiner

U.S. Cl. X.R.

179—100.1; 274—4